United States Patent [19]

Smith et al.

[11] Patent Number: 5,419,329
[45] Date of Patent: May 30, 1995

[54] OPTOELECTRONIC TRANSMITTERS FOR MEDICAL ULTRASOUND TRANSDUCERS

[75] Inventors: Stephen W. Smith; Charles D. Emery, both of Durham; John C. Swartz, Chapel Hill; H. Craig Casey, Jr., Durham, all of N.C.

[73] Assignee: Duke University, Durham, N.C.

[21] Appl. No.: 253,725

[22] Filed: Jun. 3, 1994

[51] Int. Cl.$^6$ .............................................. A61B 8/12
[52] U.S. Cl. ........................... 128/661.01; 128/662.06
[58] Field of Search ..................... 128/660.08, 661.01, 128/662.06, 634, 662.03; 73/628, 633

[56] References Cited

U.S. PATENT DOCUMENTS

| | | | |
|---|---|---|---|
| 4,482,805 | 11/1984 | Palmer | 250/227 |
| 4,587,972 | 5/1986 | Morantte, Jr. | 128/660 |
| 4,684,245 | 8/1987 | Goldring | 356/41 |
| 4,803,992 | 2/1989 | Lemelson | 128/634 |
| 5,010,886 | 4/1991 | Passafaro et al. | 128/660.03 |
| 5,125,410 | 6/1992 | Misono et al. | 128/662.06 |
| 5,152,291 | 10/1992 | Dias | 128/661.08 |
| 5,211,176 | 5/1993 | Ishiguro | 128/662.06 |
| 5,284,148 | 2/1994 | Dias et al. | 128/662.06 |

OTHER PUBLICATIONS

C. H. Lee; *Optical Control of Semiconductor Closing and Opening Switches,* IEEE Transactions on Electron Devices, 37:2426–2438 (1990).
D. H. Auston; *Impulse Response of Photoconductors in Transmission Lines,* IEEE Journal of Quantum Electronics, QE-19:639–648 (1983).
R. F. Carson, et al.; *Opticall-triggered GaAs Thyristor Switches: Integrated Structures for Environmental Hardening,* SPIE Optically Activated Switching 1378:84–89 (1990).
J. H. Hur, et al.; *GaAs Opto–Thyristor For Pulsed Power Applications,* SPIE Optically Activated Switching 1378:95–100 (1990).
A. Sasaki, et al.; *Put–In Microconnectors for Alignment— Free Coupling of Optical Fiber Arrays,* IEEE Photonics Technology Letter, 4:908–911 (1992).
C. H. Lee; *Picosecond Optoelectronic Switching in GaAs,* Applied Physics Letters, 30:84–86 (1977).
D. H. Auston; *Picosecond Optoelectronics Switching and Gating in Silicon,* Applied Physics Letters, 26:101–103 (1975).
M. D. Pocha, et al.; *Avalanche Photoconductive Switching,* Digest of Technical Papers, Seventh IEEE Pulsed Power Conference, 866–868 (1989).

Primary Examiner—George Manuel
Attorney, Agent, or Firm—Bell, Seltzer, Park & Gibson

[57] ABSTRACT

Disclosed is an ultrasonic diagnostic device which uses an optoelectronic transmitting circuit to trigger the voltage input to the 2-D array transducer elements located in the probe adjacent to the patient. The transmitting optoelectronic circuit disclosed comprises a plurality of light pulse generators, a plurality of fiber optic signal lines, and a plurality of light activated switching circuits that transmit the high voltage excitation input to the selected transducer transmit element(s).

34 Claims, 6 Drawing Sheets

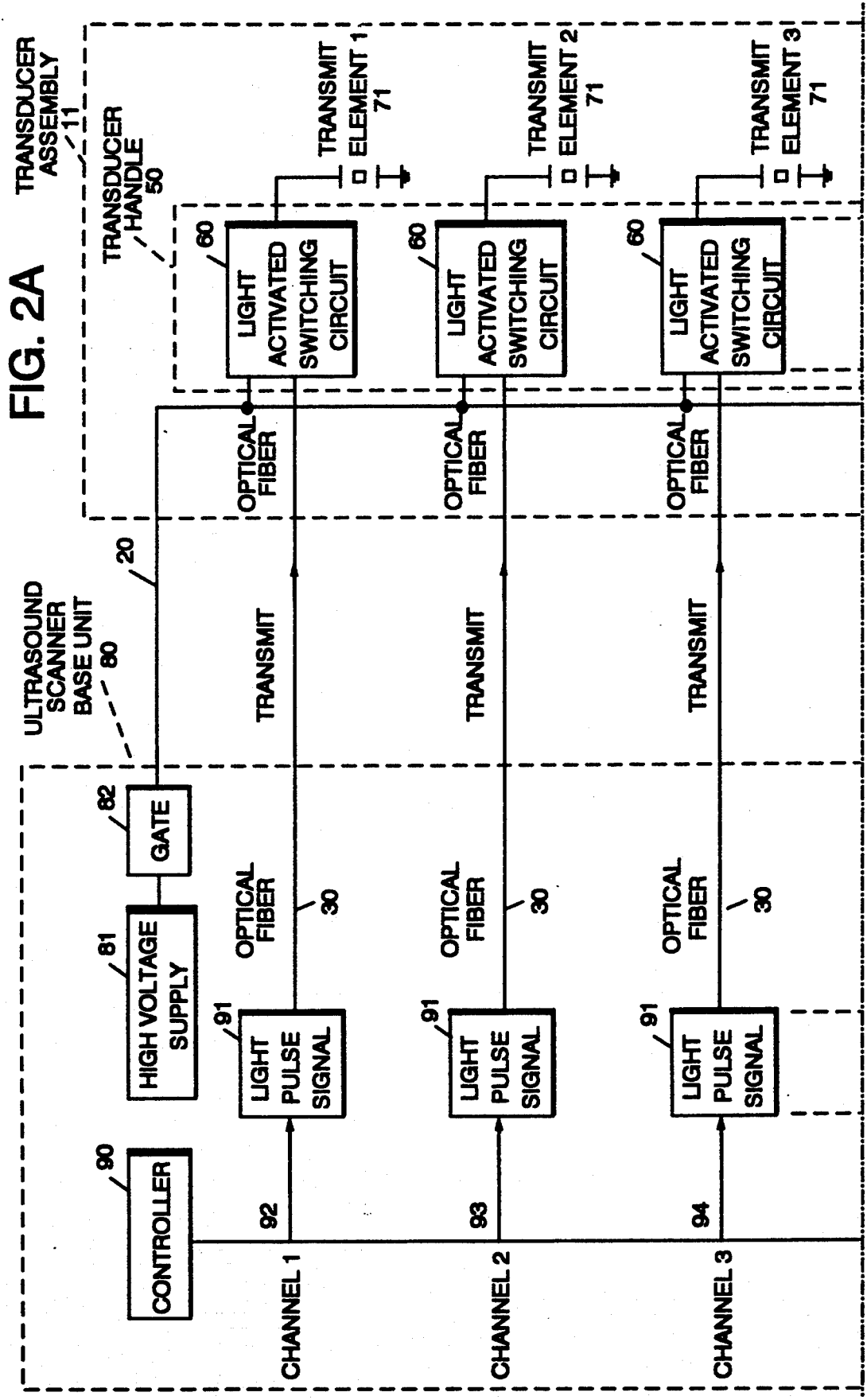

OPTOELECTRONIC TRANSMITTERS FOR MEDICAL ULTRASOUND TRANSDUCERS

This invention was made with Government support under grant numbers CA-56475 and CA-37586 from the National Institute of Health, and grant numbers CDR-8622201 and BCS-9309677 from the National Science Foundation. The Government has certain rights to this invention.

FIELD OF THE INVENTION

The present invention relates to ultrasound imaging systems. More specifically the present invention relates to optoelectronic high voltage transmit circuitry housed in the patient end of a medical diagnostic probe with a plurality of transducer elements.

BACKGROUND OF THE INVENTION

Medical ultrasound imaging systems are using increasingly complex transducer elements to achieve higher quality images and measurements. The most sophisticated medical ultrasound scanners now use linear arrays (N×1) containing over one hundred transducer elements and two dimensional arrays (N×M) containing upwards of five hundred channels. The two-dimensional arrays with their large number of transducer elements offer several advantages :over the linear arrays for B-scans including; focusing in the elevation dimension, phase aberration corrections in two-dimensions, concurrent orthogonal B-scans, real time volumetric imaging, high speed C-scans and angle independent blood flow imaging.

However, while the increased number of transducer elements have improved the imaging capability of the ultrasound system, the electronic cabling requirements have severely impacted the size, cost and flexibility of the transducer cables. Each transducer element, located in a probe which touches the patient body, requires an independent exciter circuit to supply an electronic shock-excitation or burst pulse input to generate an ultrasonic energy pulse. Currently, coaxial cables carry the electronic pulse from the ultrasound scanner to the independent transducer elements located in the transducer probe. The large number of independent transducer elements typically require a like number of independent coaxial cables. The coaxial cable with insulation and shield typically measures 0.46 mm diameter or greater per channel. The large quantity of channels multiplies the size of the transducer assembly cable which can make it extremely stiff, heavy, and costly.

Pliant fiber optic cables have diameters nearly ten times smaller than the coaxial cables. Fiber optic cables have not been used to transmit high voltage to transducers with a multiplicity of elements but have seen limited use in intra-cavity and intra-blood-vessel ultrasound imaging to electrically isolate the patient.

SUMMARY OF THE INVENTION

A first aspect of the present invention is a medical ultrasound transducer assembly configured for insertion in or contacting to the human body having an optoelectronic transmitter. The assembly comprises a transducer array having a plurality of transducer transmit and receive elements. A plurality of light activated switching circuits is included, each of which is connected to a respective one of the transducer transmit elements, and each of which includes a photosensor. A high voltage line is connected to each of the light activated switching circuits. A plurality of optic fibers for carrying light signals are also included, with at least one fiber connected to each of the light activated switching circuits, with the light activated switching circuits configured so that the high voltage to the transducer transmit elements is controlled by the light signals in the optic fiber cable.

A second aspect of the present invention is an ultrasound scanner base unit. The unit comprises a digital controller having a plurality of transmit channel lines and a light pulse generator connected to each of the transmit channel lines. The unit also comprises a conventional receive processing system with a plurality of receive channel lines.

A third aspect of the present invention is an ultrasound scanner system with optoelectronic transmitters comprising an ultrasound scanner base unit as given above with an ultrasound transducer assembly as set forth above connected thereto.

The foregoing and other objects and aspects of the present invention are described in greater detail in the drawings herein and the specification set forth below.

BRIEF DESCRIPTION OF THE ACCOMPANYING DRAWINGS

DETAILED DESCRIPTION OF THE INVENTION

Figure 1:
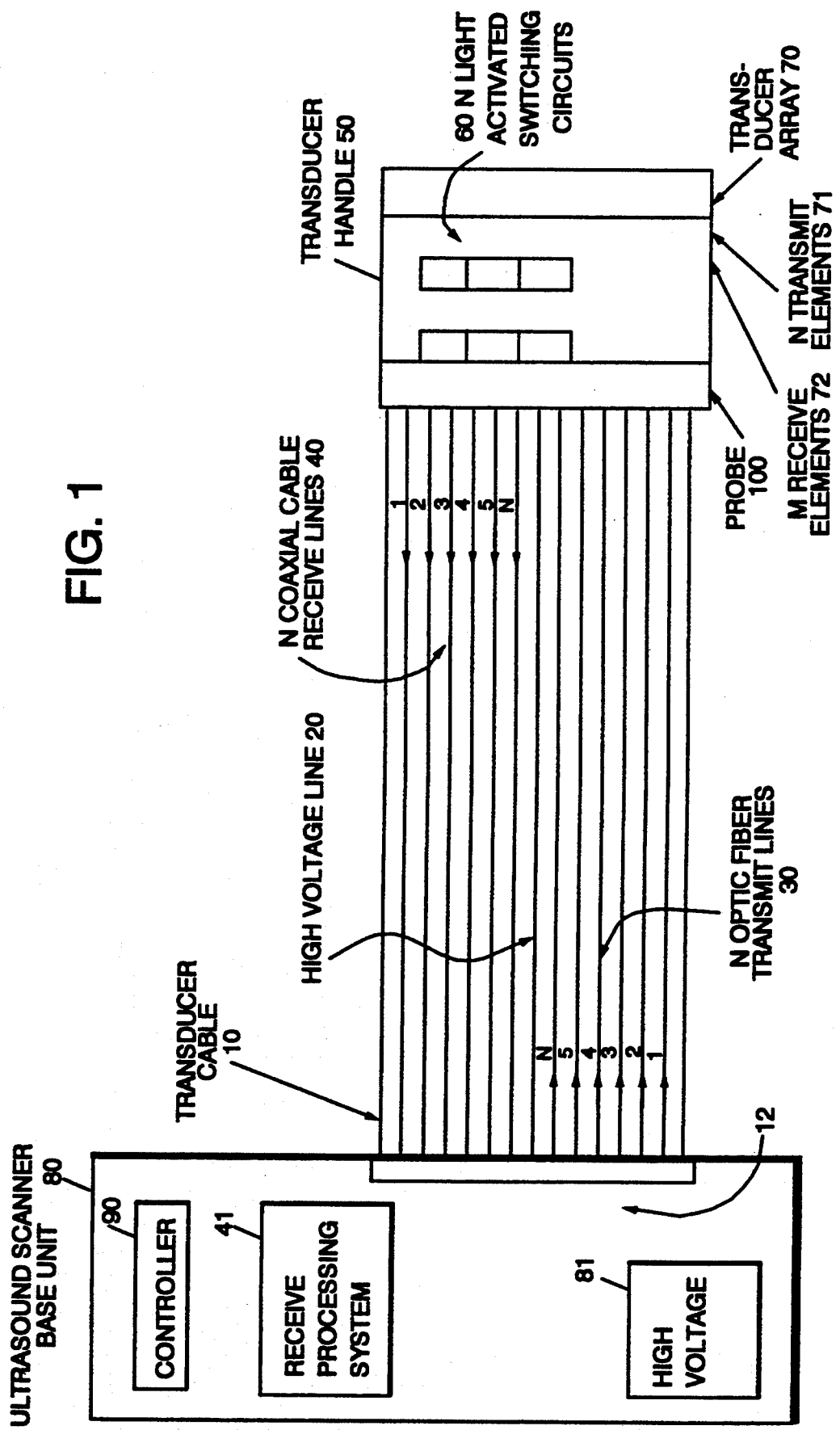
FIG. 1 is a block diagram of an ultrasound scanner system with an optoelectronic transmit circuit.

FIG. 1 shows an ultrasound scanner system with optoelectronic transmit circuitry. The ultrasound base unit 80 typically houses the high voltage power source 81, the digital controller 90 with transmit control channels (FIG. 2 items 92–95), the light pulse generator circuits (FIG. 2 item 91), the receive processing system 41, and the system connection 12 for the transmit lines 30, the receive lines 40 and the transducer high voltage power line 20.

Figures 2, 2B:
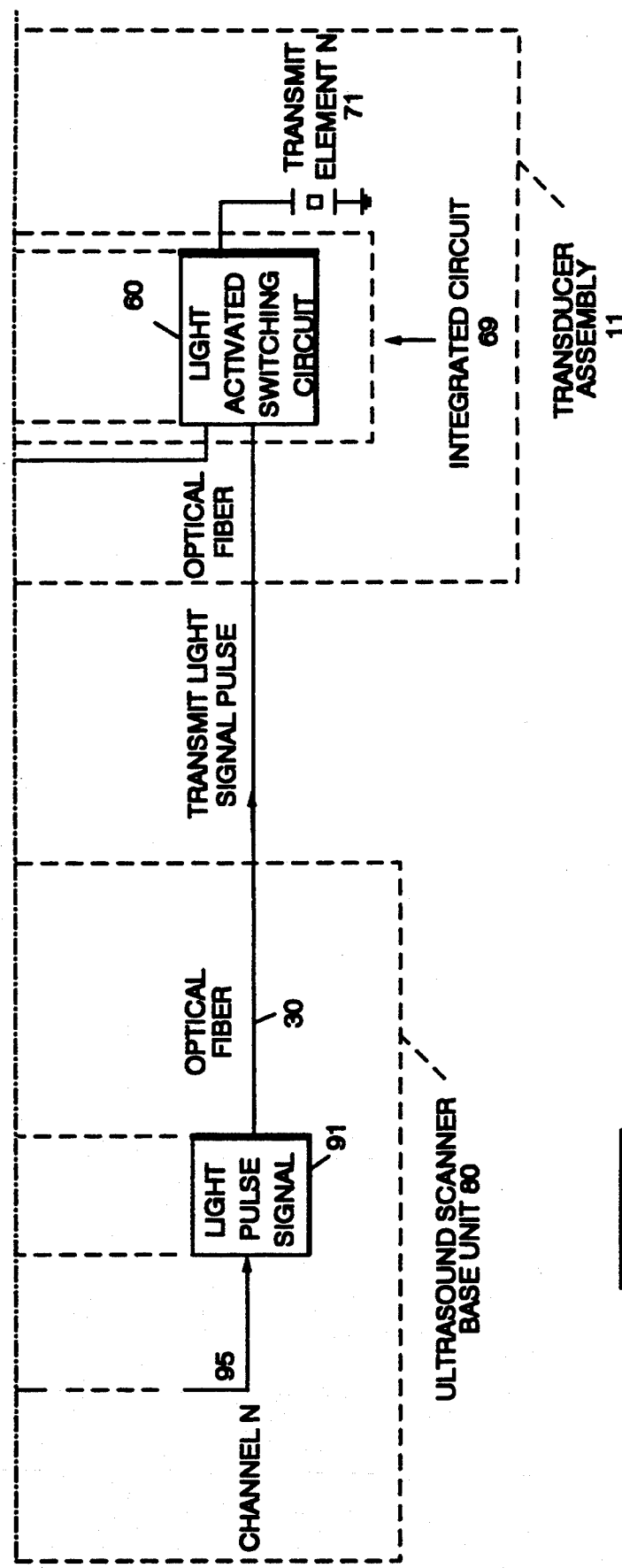
FIG. 2 is a schematic of the transmit circuitry of an apparatus as shown in FIG. 1.

Included in the ultrasound scanner system is a transducer assembly (FIG. 2 item 11). The transducer assembly (FIG. 2 item 11) typically comprises a transducer cable 10 usually grouping the transmit lines 30, the receive lines 40, and the high voltage line 20 in a single cable. The assembly also comprises a transducer array 70 with a plurality N of transducer transmit elements 71 and a plurality M of transducer receive elements 72. In addition, the transducer assembly typically has a transducer handle 50, with a plurality of light activated switching circuits 60 located in the transducer handle 50, an ultrasound probe 100 that houses the transducer array 70, and the scanner base unit cable connector 12. The scanner base unit connection 12 provides the transducer 70 interface to the controller 90.

The digital controller 90 has a multiplicity of transmit channels (FIG. 2 items 92–95). The controller 90 controls the operation of the array transducer 70 by sending a pulse signal (see also FIG. 2 item 91) in the appropriate channel(s) (FIG. 2 items 92–95). The signal activates the light pulse generator (FIG. 2 item 91) to send a light signal on the corresponding optic fiber line 30, normally located in the transducer cable 10, but could be in the transducer handle 50. The optic fiber 30 carries the light signal to the corresponding light activated switching circuit 60 located in the transducer handle 50 of the ultrasound probe 100. The light activated switching circuit(s) 60 with a photosensor (see FIG. 4 item 61) senses the light signal and switches the high voltage 81 into the corresponding transducer element(s) 70. The high voltage line 20 is also typically housed within the transducer cable 10 and is individually connected to each of the light activated switching circuits 60. The high voltage 81 can only be transmitted to the transducer transmit element(s) 71 when the controller 90 has gated on (see also FIG. 2 82) the high voltage 81—which is only in the transmit mode. The transmitted high voltage 81 then excites the selected transducer transmit element(s) 71 which causes the selected transducer transmit element(s) 71 inside the probe 100 (which touches the patient either externally or internally) to produce a pressure wave, i.e., transmit the ultrasound signal into the body. The probe 100 which houses the transducer 70 and the associated electronics is typically permanently attached to the transducer cable 10 to minimize the number of connections. However, it is possible to interconnect the probe 100 and the transducer cable 10 in an interchangeable manner and maintain the operative relationship for the system interface.

The body then echoes the signal back to the transducer 70. The controller 90 sequences over to the receive mode and the transducer receive elements 72 which are individually connected to at least one of a corresponding set of coaxial electric signal lines 40 receive the echo(es) and convert the echo(es) into an electric pulse signal(s). A conventional receive processing system 41 comprises along with a plurality of receive electric signal lines 40—a plurality of receiver amplifiers, delay lines, a scan converter, a display monitor, and associated circuitry. The electric signal is carried back to the ultrasound scanner system 80 via the coaxial cable electric signal lines 40 also typically located inside the transducer cable 10. The transducer cable 10 is attached to the ultrasound scanner base unit 80. The typical means is by a connector type interface 12, but a hardwired alterative would function in an equivalent manner.

FIG. 2 illustrates the optic and electronic transmit schematic of the imaging system. A controller 90 controls the timing, modes and channels normally through transistor—transistor logic (TTL). In the transmit mode, a controller 90 opens the gate 82 to the high voltage supply 81 (10–400 V) and directs the appropriate transmit channel(s) 92–95 to generate a light pulse signal 91 to individually stimulate the array transducer transmit elements 71 (typical element stimulus is in the 1–10 Mhz range). The light signal travels through the corresponding optic fiber 30 to the corresponding light activated switching circuit 60 located in the transducer handle 50. The light activated switching circuit 60 senses the light pulse signal 91 and allows the high voltage 81 to be transmitted to the corresponding transducer transmit element 70. The light activated switching circuit(s) 60 typically triggers the high voltage 81 on by a light signal but could operate in reverse by inversing the logic and thereby trigger the high voltage off when the light signal is on. The excitation can be a single shock light pulse or a burst excitation with a multiplicity of light pulses or other similar type of input pulsing method. The pulses can be of the unipolar or bipolar type.

The light activated switching circuits 60 may be miniaturized by using integrated circuits 69. The integrated circuit technique may use one integrated circuit for all the light activated switching circuits or only for a subset of the circuit components or a combination of more than one integrated circuit to the same result. The function of the light activated switches will obviously be the same for a large variety and quantity of integrated circuit grouping techniques. The connection of the optic fibers 30 to the integrated circuits 69 can be accomplished by microconnection techniques as developed by Sasaki which use silicon micromachining techniques. A. Sasaki et al., *Put-in Microconnectors for Alignment-Free Coupling of Optical Fiber Arrays*, 4 IEEE Photonics Technology Letters, no. 8, 908–911 (1992).

Figure 3:
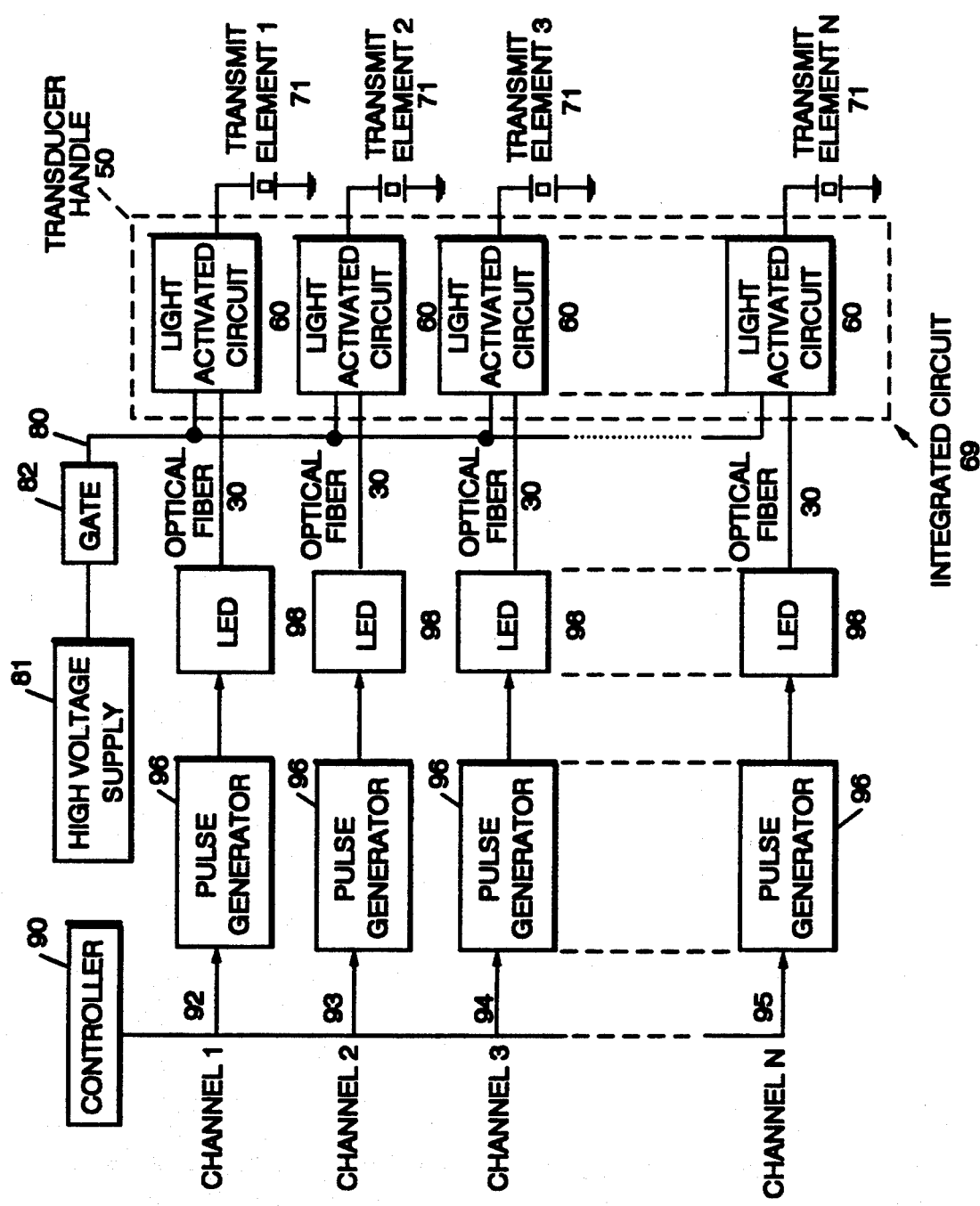
FIG. 3 shows schematically optoelectronic transmit circuitry which uses an LED to generate the light signal.
Figure 4:
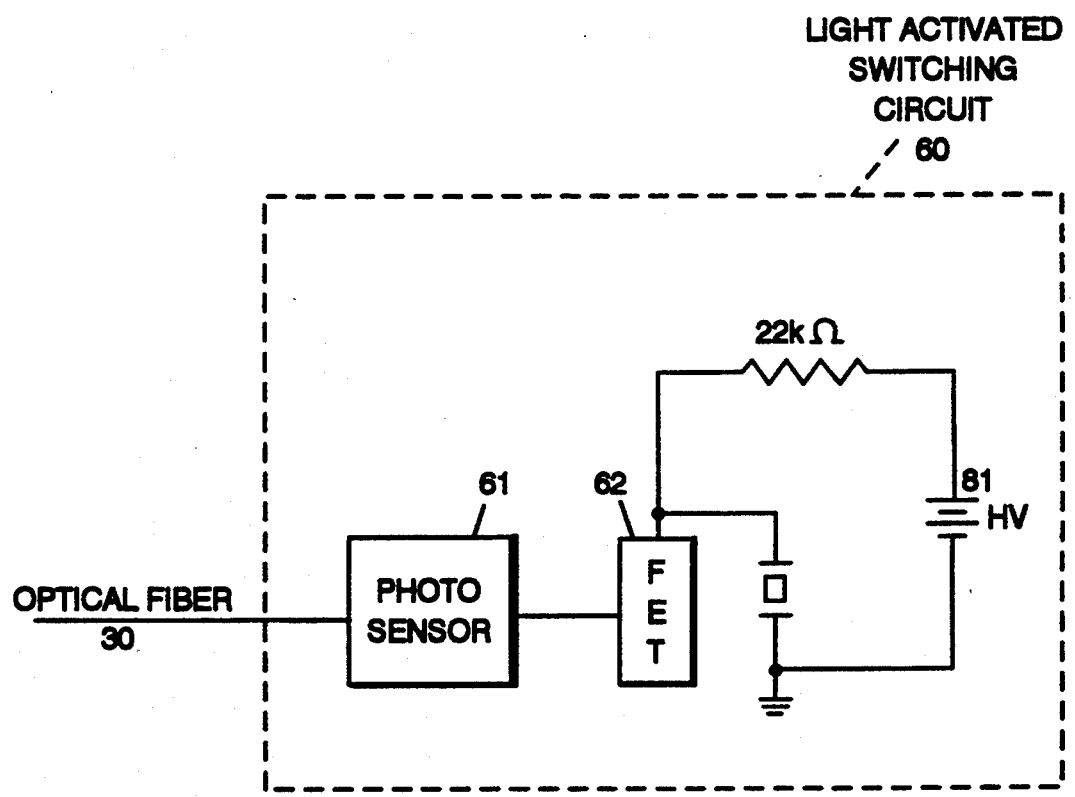
FIG. 4 shows the photosensor and light activated switching circuit illustrated in FIG. 3 in greater detail.

FIG. 3 shows an optoelectronic circuit that utilizes a controller 90 to direct a pulse generator 96 to activate a light emitting diode (LED) 98. The LED 98 can be of several types which will function to produce the light signal, (for example a low power LED with a power rating of 100 microWatts and a wave length of 660 nm). The LED 98 generates a light pulse signal which is sent through the corresponding optic fiber 30 to the light activated switching circuit 60 which is located in the transducer handle 50. One option of a light activated switching circuit, as illustrated in FIG. 4, uses a photosensor 61 such as a photodiode (which typically includes an amplifier) to activate a high voltage field effect transmitter (FET) 62 to transmit the high voltage 81 through the cable 20 to the selected transducer transmit element(s) 71. The photosensor 61 could also be a photothyristor, phototransistor, PCSS (photoconductive semiconductor switch) or other equivalent sensing component. Again it should be noted that the high voltage 81 is gated 82 for safety to only allow supply in the transmit mode.

Another option envisioned is to locate the light pulse generators (FIG. 2 item 91) as an array of LEDs in either the probe 100 or handle of the transducer 50. This alternative would reduce the length of the optic fibers 30 to the short length necessary to interconnect the LED 98 with its associated light activated switching circuit 60 also in the transducer handle 50. The controller 90 would trigger the appropriate LED(s) 98 by sending a signal on at least one electric signal line to a digital memory located in the probe (FIG. 1 item 100). The digital memory would be capable of storing the phase array transmit data for the entire ultrasound scanner system. The digital memory would then activate the appropriate transmit LED's 98 to send the light pulse signal(s) to the light activated switching circuit(s) 60 and excite the desired transducer transmit elements 71 to achieve the desired ultrasound input pulse. This configuration would further reduce the size of the transducer cable (FIG. 1 item 10) and allow for easier probe 100 and transducer cable (FIG. 1 item 10) interchangeability by minimizing the complexity of the transducer cable connection at the probe 100.

Figure 5:
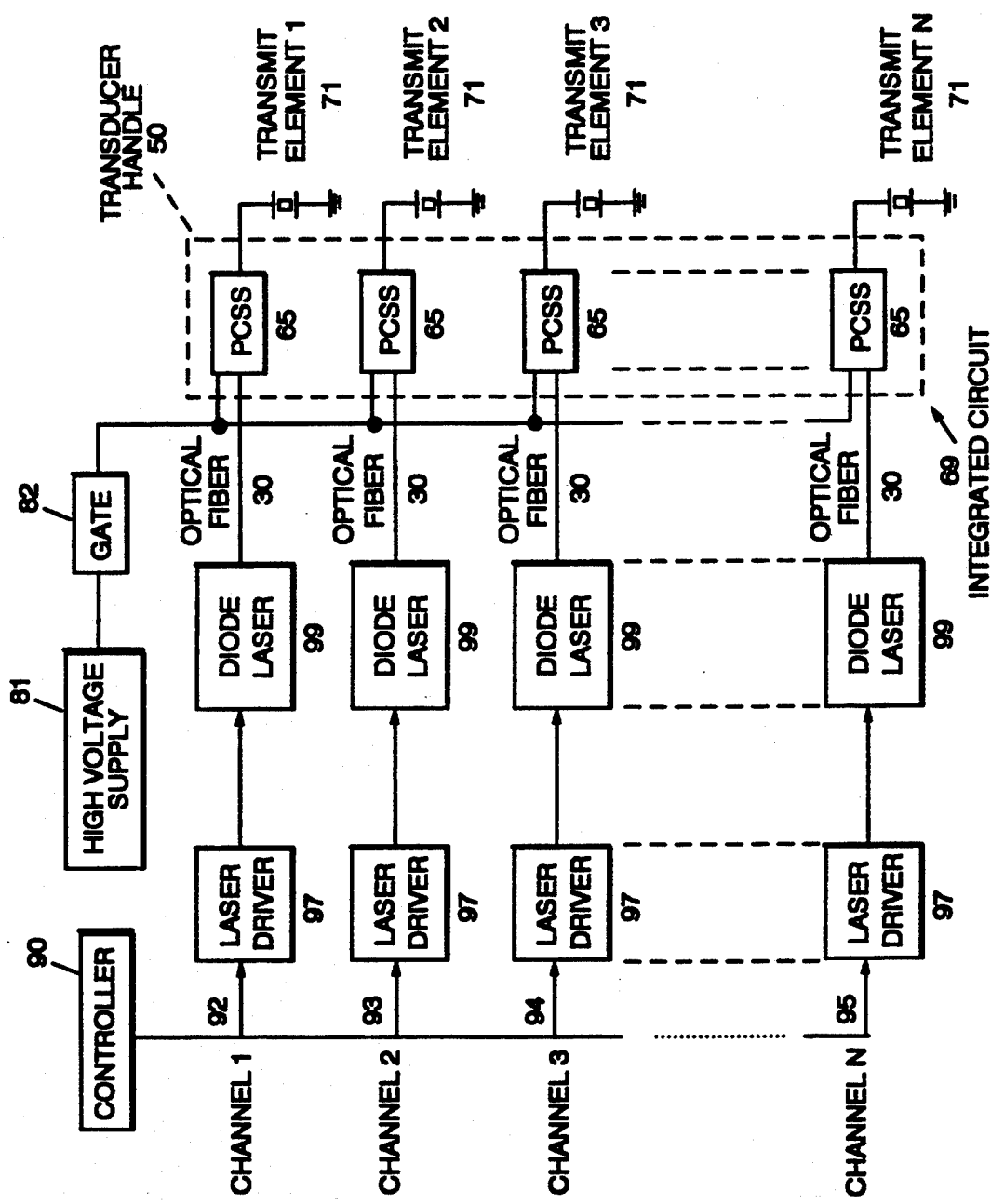
FIG. 5 shows a schematic with an alternative embodiment of the optoelectronic transmit circuitry which uses a laser diode to generate the light signal.

FIG. 5 uses one of several additional alternatives for the optoelectronic circuitry. The controller 90 selects the transmit channel(s) 92–95 and operates the selected laser driver 97. The laser driver 97 is typically a pulse power supply circuit. The laser driver 97 activates a diode laser 99 (which among other types could be an AlGaAs type) which generates a pulsed light signal. The light signal is carried by the corresponding optic fiber 30 to a light activated switching circuit 65 located in the transducer handle 50. One possible light activated switching circuit alternative is a photoconductive semiconductor switch 65 (PCSS). The PCSS 65 circuit can also comprise a capacitor (2 nF range) and a pull-up resistor of around 2 kOhms, but many other sizes and types of elements may perform the equivalent functions.

In recent years the PCSS switches have gained attention in pulsed power applications. See C. H. Lee, *Optical Control of Semiconductor Closing and Opening Switches*, 37 IEEE Trans. Electron. Dev. 2426–2438 (1990). In 1975 100 V picosecond pulses were obtained using a high resistivity silicon ($10^4$ Ohm-cm). See D. H. Auston, *Picosecond Optoelectronic Switching and Gating in silicon*, 26 Applied Phys. Letters, 101–103 (1975). In 1977, 600 V picosecond pulses were obtained using GaAs which compared to silicon, offer higher resistivity, faster recombination lifetimes, and better thermal qualities. See C. H. Lee, *Picosecond Optoelectronic Switching in GaAs*, 30 Applied Phys. Letters, 84–86 (1977). The high voltage applications typically use PCSS's with photoconductive gaps in the millimeter or centimeter range whereas the low voltage applications use PCSS's with typical photoconductive gaps in the micron range. The ultrasound application is a hybrid of the two applications with switching in the range of approximately 10–400 V and resonant frequencies at about 1–10 Mhz. The prototype PCSS had a gap length of 50 micrometers. The optically triggered pulse for single shock excitation produced 30 V spikes at the two-dimensional array transducer element with a fall time of 200 nsec and a rise time of 2 microseconds and a peak current of 34 mA. An optically produced burst of eight pulses at a frequency of 2.5 MHz produced 11 V spikes at the transducer with a fall time under 100 nsec and a rise time of approximately 300 nsec with a peak current per pulse of 25 mA through the transducer element. Scientific principals verify performance improvement can be achieved by altering the prototype switch design and fabrication. Some of the possible alterations include increasing gap width, focusing the light at the switch, application of different bulk materials, changing the switch geometry, and growth of silicon dioxide on the surface to limit surface recombination.

The operation of the PCSS is based on the optical generation of carriers, electrons, and holes, in excess of thermal equilibrium values. Electrical conductivity of semiconductors which is between the electrical combination of insulators and metals can be varied by temperature, optical excitation, and impurities with the material. See B. G. Streetman, *Solid State Electronic Devices*, (1990, Prentice Hall). The energy level diagram of silicon at 300 K consists of a conduction band and valence band separated by a distance called the energy gap ($E_g$). At 300 K, $E_g$ is equal to 1.125 eV which is the difference between the lowest energy in the conduction band ($E_c$) and the highest energy in the valence band ($E_v$). At 300 K enough thermal energy is available to allow some of the electrons with the valence band to move to the conduction band leaving a hole in the valence band. The thermally generated carriers, holes and electrons, increase the conductivity of the semiconductor. If photons with energy ($E_{ph}=hc/\lambda$) greater than $E_g$ are absorbed by the material where h (Joule sec) is Plank's constant, c (m/sec) is the speed of light, and $\lambda$(m) is the wavelength of light, then more electrons are excited to the conduction band which further increases the conductivity of the material above the thermal conductivity. One electron-hole pair is produced for every photon absorbed. If the optical excitation is removed, the conductivity decreases to thermal equilibrium values as electron-hole pairs recombine within the valence band. The conductivity of the material ($\sigma$) in Mhos per centimeter can be calculated by:

$$\sigma = q(\mu_n n + \mu_p p) \qquad (1)$$

where q is $1.6*10^{-19}$ Coulombs, $\mu_n$ and $\mu_p$ (cm$^2$/(Volt sec)) are the electron and hole mobilities, and n (cm$^{-3}$) and p (cm$^{-3}$) are the electron and hole concentrations. Under optical excitation n and p can be written as the sum of two terms:

$$n = n_o + \Delta n \qquad (2a)$$

$$p = p_o + \Delta p \qquad (2b)$$

where $n_o$ and $p_o$ are the thermal equilibrium values of electrons and holes, and $\Delta n$ and $\Delta p$ are the electrons and holes created through optical excitation. Through Fermi-Dirac statistics and the allowed energy states of electrons and holes it can be shown:

$$p_o n_o = n_i^2 \qquad (3)$$

where $n_i$(cm$^{-3}$) is the intrinsic carrier concentration. Because one photon creates one electron-hole pair, the number of optically generated holes must equal the number of optically generated electrons.

$$\Delta n = \Delta p \qquad (4)$$

The basic PCSS structure consists of a high resistivity semiconductor with two metallic contacts deposited on the bulk material. The metallic contacts allow for the placement of an external electric field across the switch which promotes the drift of electrons and holes with the semiconductor which creates a current. The variable $d_e$ (cm) is the effective depth of current conduction. The current increases as more carriers are produced through optical excitation. If the switch is uniformly illuminated at the surface the generation of carriers as a function of depth (x) is governed by Lambert's Law of photon absorption, *CRC Handbook of Chemistry and Physics* 68th Edition, F-67 (Robert Weast et al. eds., 1987, CRC Press):

$$G(\text{cm}^{-3}\text{sec}^{-1}) = (1-R)N\alpha\exp(-\alpha x)/A_p \qquad (5)$$

where R is the reflectivity of the material, N is the number of incident photons per second illuminating the material, $\alpha$ (cm$^{-1}$) is the optical absorption coefficient, and $A_p$ (cm$^2$) is the area illuminated at the surface. For silicon with a relative dielectric constant of 11.8 the reflectivity is 0.30 for illumination perpendicular to the surface. N can be calculated by knowing the optical power P(t) (Watts), a time dependent function, and the energy of one photon $E_{ph}$ (Joules):

$$N = P(t)/E_{ph} \qquad (6)$$

$A_p$ is equal to the gap length L (cm) multiplied by the width of the metallic strip W (cm). The optical absorption coefficient $\alpha$ increases as wavelength decreases. Therefore, (5) can be rewritten using (6) and the quantities listed above as:

$$G = (1-R)P(t)\alpha \exp(-\alpha x)/(E_{ph}LW) \quad (7)$$

The prototype silicon photoconductive switch was made from float zone phosphorous doped silicon with a mean resistivity $\rho$ of 12,500 $\Omega$cm. Because $\rho = 1/\sigma$, $p_o$ and $n_o$ at 300 K can be calculated using (1) and (3).

$$p_{no} = 6.1*10^8 \text{ cm}^{-3} \quad (8a)$$

$$n_{no} = 3.7*10^{11} \text{ cm}^{-3} \quad (8b)$$

The subscript 'no' implies the thermal concentration of carriers for n-type silicon. The concentration of carriers within the switch under illumination can be determined by applying the continuity equation. The continuity equation for holes is given by the following equation and can be found in S. M. Sze, *Semiconductor Devices; Physics and Technology*, (1985, John Wiley & Sons):

$$\delta p_n/\delta t = -1/q \, \delta J_p/\delta x + (G_p - R_p) \quad (9)$$

where $p_n = p_{no} + \Delta p$, $J_p$ (A/cm$^2$) is the hole current density, $G_p$ (cm$^{-3}$sec$^{-1}$) is the generation rate of holes given by (7) and $R_p$ (cm$^{-3}$sec$^{-1}$) is the recombination rate of holes. $J_p$ is given by:

$$J_p = q\mu_p p_n E - qD_p \delta p_n/\delta x \quad (10)$$

[See Sze, supra] where E(V/cm) is the electric field in the depth direction and $D_p$(cm$^2$/sec) is diffusivity of holes. The recombination rate $R_p$ under low levels of illumination is given by [See Sze, supra]:

$$R_p = (p_n - p_{no})/\tau_p \quad (11)$$

where $\tau_p$ is the effective hole recombination lifetime. To solve the continuity equation for the silicon photoconductive switch we assume E=0 in the depth direction, low levels of illumination, uniform illumination, and steady state operation (P(t)=P, $\delta p_n/\delta t = 0$). The boundary conditions of $p_n(x)$ are given by:

$$p_n(x = \text{infinity}) = p_{no} \quad (12)$$

$$D_p \delta p_\pi/\delta x \text{ (at } x=0) = S_\pi(p_n(0) - p_{no}) \quad (13)$$

[See Sze, supra]. The boundary condition at x=infinity is due to the absorption process within the semiconductor. The second boundary condition stems from an increased number of energy levels at the surface when compared to the bulk which increases the recombination rate at x=0 (equation 13). $S_{90}$ (cm/sec) is the recombination velocity for low level injection at the surface.

The continuity equation for holes (9) can be solved by applying (10), (11), (12), (13), and the various assumptions:

$$p_n(x) = (1-R)P\alpha/(E_{ph}LW(D_p\alpha^2 - 1/\tau_p))[(D_p\alpha + S_{90})/(S_\pi + D_p/L_p)\exp(-x/L_p) - \exp(-\alpha x)] + p_{no} \quad (14)$$

where $L_p$ is the diffusion length and is given by:

$$L_p = (D_p\tau_p)^{\frac{1}{2}} \quad (15)$$

Equation (14) clearly shows that $p_n(x)$ is the sum of the thermal equilibrium value and an optical generation term which is a function of depth (x). The conductivity of the switch (1) can be rewritten using (2a), (2b), and (4):

$$\sigma(x) = q(\mu_n(n_{no} + \Delta p(x)) + \mu_p(p_{no} + \Delta p(x))) \quad (16)$$

Rearranging terms:

$$\sigma(x) = q(\mu_n n_{no} + \mu_p p_{no}) + q\Delta p(x)(\mu_p + \mu_n) \quad (17)$$

which shows the conductivity is the sum of the thermal equilibrium conductivity and the optical generation conductivity. The conductance $G_{tot}$ of the switch in Mhos is determined by the integration of (17) with respect to depth from x=0 to x=$d_e$:

$$G_{tot} = W/L \int_0^{d_e} \sigma(x) dx \quad (18)$$

Finally, resistance $R_{tot}$ (Ohms) is determined by $1/G_{tot}$. For example, if a phosphorous doped silicon switch with L=35 $\mu$m, W=10 $\mu$m, $p_{no}=6.1*10^8$ cm$^{-3}$, $\tau_p=300$ $\mu$sec, $D_p=12.5$ cm$^2$/sec, $\alpha=5*10^3$ cm$^{-1}$, and $S_\pi=1*10^6$ cm/sec is illuminated with He—Ne laser ($\lambda=632.8$ nm) with a power of $2.17*10^{-7}$ Watts which yields a conduction depth $d_e$ of 900 $\mu$m, then $R_{tot}=89$ kOhms.

$G_{tot}$ which was determined in (18) can actually be thought of as the sum of a thermal equilibrium term $G_d$ and optical generation term $G_{opt}$:

$$G_{tot} = G_d + G_{opt} \quad (19a)$$

$$G_d = q(\mu_n n_{no} + \mu_p p_{no}) W d_e/L \quad (19b)$$

$$G_{opt} = W/L \int_0^{d_e} q\Delta p(x)(\mu_p + \mu_n) dx \quad (19c)$$

The summation of two conductances signifies two resistors in parallel.

$$R_d = 1/G_d \quad (20a)$$

$$R_{opt} = 1/G_{opt} \quad (20b)$$

The simple circuit model of the PCSS includes a variable resistor $R_{opt}$ (20b), a fixed resistor $R_d$ (20a), and a capacitor $C_g$ [D. H. Auston, *Impulse Response of Photoconductors in Transmission Lines*, QE-19, 4 IEEE Jour. Quant. Elect., 639–648, (April 1983)]. The capacitance $C_g$ is due to the fringing electric field caused by the break in the electrode. Under the steady state conditions and a constant electric field the total current passing through the PCSS should be the sum of the dark current and the optical current.

One way to fabricate the switch is described below. The prototype PCSS was a photolithographic mask design. The contact pads measured 300 $\mu$m $\times$ 300 $\mu$m and were used for wire bonding to the switch. The trace coming off the contact pad was 10 $\mu$m gap. The emulsion mask, made at Redstone National Laboratory, was used to transfer 480 switches with various gap lengths to a silicon wafer via photolithography. Phosphorous doped float zone silicon wafers (International Wafer Services, Portola, Calif.) with a mean resistivity of 12,500 Ohm cm and <111> orientation were used for the photoconductor. The silicon wafers had a diameter of 7.5 cm and thickness of 864 μm to 889 μm. After cleaning the silicon wafers, aluminum with a thickness of 2000 Angstroms was deposited onto the silicon in resistance heated evaporator. Aluminum adheres well to silicon and has low resistivity, but suffers from poor thermal qualities. See S. Wolf and R. N. Tauber, *Silicon Processing for the VLSI Era: Volume 1—Process Technology*, (Lattice Press 1986). The aluminum was removed by a wet etch technique primarily involving phosphoric acid.

The individual switches were removed from the silicon wafer by using a diamond blade dicing saw (Kulicke & Soffa Industries, Inc., Model 780, Willow Grove, Pa.) with a 4 mil kerf or manually cleaving them. Groups of five to seven switches were mounted on a gold rectangular package (Electrovac, Model F2,650,800, West Milford, N.J.) with five minute epoxy. Electrical connections between the gold posts of the package and the aluminum contact pads were made via an ultrasonic wedge bonder (Hybond, Model 572, Escondido, Calif.) with 1 mil gold wire (Sigmund Cohn Corp., Mount Vernon, N.Y.). The switches with the gold wire bonds were mounted in a rectangular package approximately the size of a quarter.

The foregoing is illustrative of the present invention, and not to be construed as limiting thereof. The invention is defined by the following claims, with equivalents of the claims to be included therein.

That which is claimed is:

1. A medical ultrasound transducer assembly configured for insertion in or contacting to the human body and having an optoelectronic transmitter, said assembly comprising:
    a transducer array having a plurality of transducer transmit elements and a plurality of transducer receive elements;
    a plurality of light activated switching circuits, each of which is connected to a respective one of said transducer transmit elements, and each of which includes a photosensor;
    a high voltage line connected to each of said light activated switching circuits; and
    a plurality of optic fibers for carrying light signals, at least one fiber connected to each of said light activated switching circuits, with said light activated switching circuits configured so that the said high voltage to said transducer transmit elements is controlled by said light signals in said optic fiber cable.

2. A device according to claim 1, said apparatus further comprising a transducer handle, and wherein said light activated switching circuits are located in said transducer handle.

3. A device according to claim 1 further comprising a plurality of electric signal lines, at least one of said electric signal lines connected to each of said transducer receive elements for carrying an electric pulse received from said transducer.

4. A device according to claim 1, wherein said light activated switches together comprise at least one integrated circuit.

5. A device according to claim 1, wherein each of said light activated switches is an integrated circuit.

6. A device according to claim 1 wherein said switching circuit is configured so that said high voltage is on when a light signal is supplied thereto.

7. A device according to claim 1 wherein said switching circuit is configured so that said high voltage is off when a light signal is supplied thereto.

8. A device according to claim 1 wherein said photosensor is a photodiode.

9. A device according to claim 1 wherein said photosensor is a photoconductive semiconductor switch (PCSS).

10. A device according to claim 1 wherein said photosensor is a photothyristor.

11. A device according to claim 1 wherein said photosensor is a phototransistor.

12. A device according to claim 1 wherein each of said light activated switching circuits further comprises a field effect transmitter (FET) to transmit said high voltage to at least one of said transducer transmit elements.

13. A device according to claim 1, further comprising connecting means operatively associated with said transducer assembly for connecting said transducer assembly to an ultrasound controller.

14. A device according to claim 13 wherein said transducer assembly further comprises cable means for grouping said optic fibers and said high voltage line into a single cable.

15. A device according to claim 1 wherein said photosensor is a phototransistor.

16. A device according to claim 1 wherein each of said light activated switching circuits further comprises a field effect transmitter (FET) to transmit said high voltage to at least one of said transducer transmit elements.

17. An ultrasound scanner system having optoelectronic transmitters, said system comprising an ultrasound scanner base unit and an ultrasound transducer assembly connected thereto, with said transducer assembly configured for insertion in or contacting to the human body; with
    (a) said ultrasound scanner base unit comprising:
        an ultrasound controller having a plurality of transmit channel lines,
        a light pulse generator connected to each of said transmit channel lines for producing light signals; and
        a high voltage power source; and with
    (b) said ultrasound transducer assembly comprising:
        a transducer array having a plurality of transducer transmit elements and a plurality of transducer receive elements;
        a plurality of light activated switching circuits, each of which is connected to a respective one of said transducer transmit elements, and each of which includes a photosensor;
        a high voltage line connected to said high voltage power source and to each of said light activated switching circuits; and
        a plurality of optic fibers for carrying said light signals, with at least one fiber connected to each of said light pulse generators, with at least one fiber connected to each of said light activated switching circuits, and with said light activated switching circuits configured so that high voltage provided to said transducer transmit elements from said high voltage power source is controlled by said light signals carried in said plurality of optic fibers.

18. A system according to claim 17, wherein said high voltage is gated on when said ultrasound controller is in the transmit mode.

19. A system according to claim 17, wherein said high voltage supply is gated off when said ultrasound controller is not in the transmit mode.

20. A device according to claim 17, further comprising connecting means operatively associated with said ultrasound controller for connecting said ultrasound controller with said transducer assembly.

21. A device according to claim 17 further comprising a plurality of electric signal lines, at least one of said electric signal lines connected to each of said transducer receive elements for carrying an electric pulse received from said transducer.

22. A device according to claim 21 wherein said transducer assembly further comprises cable means for grouping said optic fibers, said high voltage line, and said electric signal lines into a single cable.

23. A device according to claim 17 wherein said light pulse generator further comprises a diode laser as the light pulse source.

24. A device according to claim 17 wherein said light pulse generator further comprises a LED as the light pulse source.

25. A device according to claim 17, wherein said light activated switches together comprise at least one integrated circuit.

26. A device according to claim 17, wherein each of said light activated switches is an integrated circuit.

27. A device according to claim 17 wherein said switching circuit is configured so that said high voltage is on when a light signal is supplied thereto.

28. A device according to claim 17 wherein said switching circuit is configured so that said high voltage is off when a light signal is supplied thereto.

29. A device according to claim 17 wherein said photosensor is a photodiode.

30. A device according to claim 17 wherein said photosensor is a photoconductive semiconductor switch (PCSS).

31. A device according to claim 17 wherein said photosensor is a photothyristor.

32. A device according to claim 17, said apparatus further comprising a transducer handle, and wherein said light activated switching circuits are located in said transducer handle.

33. An ultrasound scanner base unit for an ultrasound scanner system having optoelectronic transmitters, said base unit comprising:
   an ultrasound controller having a plurality of transmit channel lines; and
   a light pulse generator connected to each of said transmit channel lines for producing light signals.

34. An ultrasound scanner base unit according to claim 33, further comprising a high voltage power source.

* * * * *